Patented June 10, 1947

2,422,003

UNITED STATES PATENT OFFICE 2,422,003

WOOD BATTERY SEPARATOR AND PROCESS FOR PRODUCING SAME

Eduard Farber, Washington, D. C., assignor, by mesne assignments, to Evans Products Company, Detroit, Mich., a corporation of Delaware No Drawing. Application November 26, 1945, Serial No. 630,996

6 Claims. (Cl. 136—150)

This invention relates to improved wood battery separators and a novel process for their production.

It is conventional practice to subject wood battery separators to an initial leaching operation, usually with alkali, to remove deleterious substances therefrom, which would be injurious to the battery, and to impart to the wood battery separators the requisite electrical characteristics.

Following the initial leaching treatment, the wood battery separators are normally transferred to the point of their assembly in storage batteries in a wet condition. This is made necessary because when the leached wood battery separators are permitted to dry, they warp, crack, and otherwise become unsuitable for use.

It is among the purposes of the present invention to provide wood battery separators and a method for their production, which separators can be dried at the point of manufacture, transported in a dried condition and, where desired, assembled into the battery while dry. It is thus a further and more specific object of the invention to produce wood battery separators that can be transported dry, and that will possess the requisite electrical characteristics to ensure their efficient performance in storage batteries of the lead-sulfuric acid type.

In using wood for separators in lead-sulfuric acid storage batteries, it is important to prepare the wood separator in such manner that it retains its dimensions on drying and on subsequent immersion in the battery acid. At the same time, the wood separator should be made sufficiently permeable to the aqueous acid of the electrolyte so that it offers only little resistance during the charging or discharging of the battery. It is accordingly one purpose of the present invention to provide a method by which a sufficiently permeable and dimensionally stable wood separator is obtained without introducing materials which reduce the efficiency of the battery.

Speaking generally, the method for producing the novel wood separators consists in impregnating the wood separators, after removing alkali soluble materials, with a mixture of phosphoric and sulfuric acids in regulated amounts and proportions, and then partially drying the separators.

It is not possible to obtain stability over a sufficiently wide range of practical conditions by impregnating with sulfuric acid alone. If the amount of sulfuric acid is low enough to prevent attack on the wood, no dimensional stability can be obtained. With high amounts of, say, over 20% of sulfuric acid, relative to the weight of the wood, partial drying cannot be carried out to a water content which will keep the acid concentration low enough to prevent charring, weakening, and embrittling of the wood.

Impregnation with solutions of phosphoric acid alone does not produce a satisfactory separator. Small amounts of this acid do not prevent warping and changing of dimensions on drying and re-immersing into the battery acid. Large amounts of phosphoric acid gradually destroy the wood. No intermediate concentration of phosphoric acid in the wood has been found which will keep it sufficiently permeable and at the same time dimensionally stable.

I have now discovered that mixtures of phosphoric and sulfuric acid can be used for the impregnation of the alkali-pretreated wooden separators. Proportions and amounts have been found which afford protection against dimensional changes on drying and storing, without having a deleterious effect on the wood.

More specifically, solutions containing about equal amounts of phosphoric and sulfuric acids to give a combined acid concentration of from about 30% to 40% by weight have been found to give desired results. Impregnations with such solutions of mixed acids will leave about 15 grams of phosphoric and about 15 grams of sulfuric acid in 100 grams of dry wood substance. Drying can then be regulated so as to retain sufficient water to keep the concentration of these acids below that which will attack the cellulose.

These proportions are not strictly critical. Good results have been obtained when the phosphoric acid is kept within the range of from 10 to 20 grams per 100 grams of wood, and the sulfuric acid within 20 to 10 grams per 100 grams of wood. In equilibrium with usual relative moisture contents of the air, the weight of such impregnated wood will vary between 160 and 260 grams without considerable bleeding out of water solution or changes in the dimensions of the wood.

The presence of phosphoric acid in the separators does not introduce harmful substances into the battery acid. In fact, the presence of phosphoric acid has been found to reduce the growth of lead-sulfate crystals and, in general, to prevent sulfatation on prolonged standing of the charged battery.

Coming to a more detailed description of the present invention, it has been found that in order to obtain wood battery separators of the requisite electrical characteristics for use in lead sulfuric acid type storage batteries, the untreated wood separators must be subjected to a leaching treatment, usually with a sodium hydroxide solution. The purpose of this leaching or extraction operation is two-fold: first, to remove from the wood those components thereof which have a deleterious effect upon the functioning of the storage battery, and, second, to reduce the electrical resistance of the separator to that required for efficient use.

The extent of removal of components of the original wood battery separator is not altogether critical. The extent to which such components are removed from the original wood battery separator should be governed by the two primary factors: first, these components should not be removed to such an extent as to destroy the structure of the wood; and, second, they should be removed to a degree sufficient to reduce the electrical resistance to that required. It has been found that when the deleterious components of the wood have been removed to a degree adequate to yield a separator having an electrical resistance within the range of from .0010 to .0018 ohm, the preliminary requirements of the process of the instant invention are satisfactorily met.

In accordance with the present invention, the wood storage batteries, from which the deleterious substances have been leached, are next subjected to the acid impregnation treatment to impart thereto the necessary characteristics to permit of the drying of such wood separators while retaining their dimensional stability and to insure that they may be transported in a dry condition for subsequent assembly in storage batteries.

The impregnation of the separators may be carried out by immersing the same in a solution of mixed sulfuric acid and phosphoric acid for a time period adequate to permit the acid to fully penetrate the wood. While this may be hastened through the use of either pressure or vacuum, it is usually satisfactory to treat the separators at atmospheric pressure. Under the latter conditions, the time required for effecting the impregnation of the wood battery separators with the mixed sulfuric and phosphoric acid solution may vary somewhat, but usually a period running from two to four hours will be found satisfactory, depending upon the conditions of circulation of the impregnating fluid through the body of the battery separators under treatment and the degree of impregnation desired.

During impregnation by the mixed acids, an additional hydrolysis takes place of a part of the hemicelluloses, which usually are difficult to hydrolyze. This effect makes it possible to reduce the time of the preliminary alkaline leaching to the point where only the acidic materials and the easily dissolved hemicelluloses are removed from the original wood. Instead of the usual procedure in which the alkaline treatment has to be extended for about ten hours at near boiling temperatures, with the present method of acid impregnating, it has been found possible to restrict the alkaline leaching to a period of about four to six hours.

Following the acid impregnation treatment, the separators are removed from the impregnating bath and dried. The drying should be carefully conducted to avoid over-heating. The drying may be advantageously carried to a point where the dried battery separators have from approximately 20 to 50% moisture content.

Dried battery separators produced in accordance with the present invention have remarkable dimensional stability; they are quite flexible, and possess characteristics necessary to stand handling during transportation and assembly in the storage battery. They furthermore possess characteristics rendering them highly efficient when subjected to the action of the electrolyte in the storage battery.

By the expressions "dried battery separators" and "dry shipment," it is intended to designate the physical condition of the separators and to indicate that they contain no free water.

Having thus described my invention, what I claim is:

1. A wood battery separator for use in a lead-sulfuric acid type battery and possessing requisite dimensional stability for dry shipment, comprising an initially leached pre-formed wood battery separator impregnated with an admixture of sulfuric acid and phosphoric acid, the sulfuric acid component of the admixture representing from one-third to two-thirds of said admixture.

2. A wood battery separator for use in a lead-sulfuric acid type battery and possessing requisite dimensional stability for dry shipment, comprising an initially leached pre-formed wood battery separator impregnated with a solution containing about equal amounts of phosphoric and sulfuric acid having a combined acid concentration of about 30% by weight.

3. The method of producing dimensionally stable wooden separators characterized by impregnating alkali extracted wood separators with a mixed acid containing phosphoric and sulfuric acids, and partially drying the impregnated separators.

4. The method of producing dimensionally stable wooden separators characterized by impregnating alkali extracted wood separators with a solution containing approximately equal parts by weight of phosphoric and sulfuric acids, and then partially drying the impregnated separators.

5. The method of producing dimensionally stable wood battery separators characterized by impregnating alkali extracted wood separators with a solution containing approximately equal parts by weight of phosphoric and sulfuric acids at a combined concentration of about 30%, and then partially drying the impregnated separators.

6. The method of producing dimensionally stable wood battery separators characterized by impregnating alkali extracted wood with a solution containing approximately equal parts by weight of phosphoric and sulfuric acids at a combined concentration of about 30% and drying the wood to a weight of 1.6 to 2.6 times the dry weight of the wood substance.

EDUARD FARBER.